United States Patent [19]
Foo et al.

[11] Patent Number: 5,935,182
[45] Date of Patent: Aug. 10, 1999

[54] METHOD AND APPARATUS FOR DISCRIMINATING A VEHICLE CRASH USING VIRTUAL SENSING

[75] Inventors: Chek-Peng (Anson) Foo, Ann Arbor; Huahn-Fern (Jeff) Yeh, Novi, both of Mich.

[73] Assignee: TRW Inc., Lyndhurst, Ohio

[21] Appl. No.: 08/719,082

[22] Filed: Sep. 24, 1996

[51] Int. Cl.[6] ............................... G06F 17/00; G06F 7/00
[52] U.S. Cl. ......................... 701/45; 701/46; 280/728.1; 280/734; 180/282
[58] Field of Search .................... 701/1, 36, 45, 701/46; 280/728.1, 734, 735; 340/436; 180/274, 282

[56] References Cited

U.S. PATENT DOCUMENTS

| 4,067,608 | 1/1978 | Von Wimmersperg | 297/216.11 |
|---|---|---|---|
| 4,985,835 | 1/1991 | Sterler et al. | 701/46 |
| 5,118,134 | 6/1992 | Mattes et al. | 280/735 |
| 5,351,527 | 10/1994 | Blackburn et al. | 280/728.1 |
| 5,387,819 | 2/1995 | Ueno et al. | 307/10.1 |
| 5,398,185 | 3/1995 | Omura | 701/45 |
| 5,413,378 | 5/1995 | Steffens, Jr. et al. | 280/735 |
| 5,430,649 | 7/1995 | Cashler et al. | 701/46 |
| 5,445,413 | 8/1995 | Rudolf et al. | 701/46 |
| 5,490,066 | 2/1996 | Gioutsos et al. | 701/45 |
| 5,498,028 | 3/1996 | Carlin et al. | 280/735 |
| 5,546,307 | 8/1996 | Mazur et al. | 701/46 |
| 5,749,059 | 5/1998 | Walton | 701/45 |

*Primary Examiner*—William A. Cuchlinski, Jr.
*Assistant Examiner*—Gertrude Arthur
*Attorney, Agent, or Firm*—Tarolli, Sundheim, Covell Tummino & Szabo

[57] ABSTRACT

A sensor (22) senses crash acceleration and provides a crash acceleration signal indicative thereof. A processor (54) sums the crash acceleration signal with an occupant spring-mass model (56, 60) so as to provide an adjusted or "virtual" crash acceleration signal (64) more nearly representative of the actual acceleration of the vehicle occupant during a crash event. A discriminating circuit (70, 76, 80, 82, 90, 92, 84, 100, 104, 108, and 96) controls the actuatable restraining device (28) in response to the adjusted crash acceleration signal (64).

16 Claims, 9 Drawing Sheets

METHOD AND APPARATUS FOR DISCRIMINATING A VEHICLE CRASH USING VIRTUAL SENSING

TECHNICAL FIELD

The present invention is directed to a vehicle crash sensing system and is particularly directed to a method and apparatus for discriminating long duration, slow developing crash events.

BACKGROUND OF THE INVENTION

Actuatable occupant restraint systems, such as air bags, for vehicles are well known in the art. The air bag has an associated, electrically actuatable ignitor, referred to as a squib. Such systems further include an inertia sensing device for measuring the deceleration of the vehicle. When the inertia sensing device is subjected to a crash acceleration greater than a predetermined value, the inertia sensing device closes an electrical switch causing an electric current of sufficient magnitude and duration to be passed through the squib to ignite the squib. The squib, when ignited, ignites a combustible gas generating composition and/or pierces a container of pressurized gas, which results in inflation of the air bag.

Many known inertia sensing devices used in actuatable occupant restraint systems are mechanical in nature. Still other known actuatable occupant restraint systems for vehicles include an electrical transducer or accelerometer for sensing vehicle deceleration. Systems using an accelerometer as a crash sensor further include a monitoring or evaluation circuit connected to the output of the accelerometer. The accelerometer provides an electrical signal having an electrical characteristic indicative of the vehicle's deceleration, i.e., crash acceleration. The accelerometer is connected to a controller, such as a microcomputer. The microcomputer performs a crash algorithm on the acceleration signal for the purpose of discriminating between deployment and non-deployment crash conditions. When a deployment crash event is determined to be occurring, the restraint is actuated, e.g., an air bag is deployed.

Many types of crash algorithms for discriminating between deployment and non-deployment crash events are known in the art. Algorithms are typically adapted to detect particular types of crash events for particular vehicle platforms.

SUMMARY OF THE INVENTION

The present invention is directed to a method and apparatus for discriminating crash events and particularly to the discrimination of long duration, slow developing, soft/smooth, frontal crash events such as offset-deformable barrier crash events and car-to-car crash events. In accordance with the present invention, a monitored crash acceleration signal is adjusted using an occupant spring-mass model to provide an adjusted acceleration signal more nearly representative of occupant acceleration. The crash event is discriminated in response to a crash velocity value and crash displacement value determined from the adjusted crash acceleration value.

In accordance with the present invention, an apparatus is provided for controlling an actuatable restraining device. The apparatus comprises sensing means securable to a vehicle for sensing crash acceleration and for providing a crash acceleration signal indicative thereof. Processing means are provided for processing the crash acceleration signal with an occupant spring-mass model so as to provide an adjusted crash acceleration signal. The apparatus further includes discriminating means for controlling the actuatable restraining device in response to the adjusted crash acceleration signal.

In accordance with another aspect of the present invention, a method is provided for controlling an actuatable restraining device comprising the steps of sensing crash acceleration and providing a crash acceleration signal indicative thereof. The method further includes the steps of processing the crash acceleration signal with an occupant spring-mass model so as to provide an adjusted crash acceleration signal, and controlling the actuatable restraining device in response to the adjusted crash acceleration signal.

BRIEF DESCRIPTION OF THE DRAWINGS

The foregoing and other features and advantages of the present invention will become apparent to one skilled in the art to which the present invention relates upon consideration of the following detailed description of the invention with reference to the accompanying drawing, wherein.

DESCRIPTION OF PREFERRED EMBODIMENTS

Figure 1:
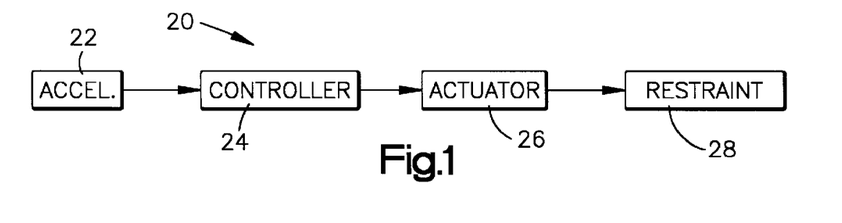
FIG. 1 is a schematic block diagram of an actuatable restraint system made in accordance with the present invention.

Referring to FIG. 1, an occupant restraint system 20, in accordance with the present invention, for use in a vehicle includes an accelerometer 22 operatively mounted in the vehicle at an appropriate location such as the vehicle's transmission tunnel. The accelerometer 22 outputs an electrical signal having a characteristic indicative of the vehicle's crash acceleration. The output of the accelerometer 22 is connected to a controller 24, such as a microcomputer. The acceleration signal is filtered to remove frequency components that are not useful in discriminating a vehicle crash condition. The filtering could occur in an accelerometer module containing the accelerometer. Further filtering of the acceleration signal preferably occurs in the controller 24 using digital filtering techniques. The filtering of the acceleration signal reduces system noise and non-useful information that may be present on the signal. It has been discovered that frequencies below 300 Hz contain useful information for crash discrimination.

The controller 24 monitors the acceleration signal and performs a crash algorithm to discriminate whether the vehicle is in a deployment or non-deployment crash event. The crash algorithm performed by the controller 24, in accordance with the present invention, uses an occupant spring-mass model to adjust the crash acceleration signal. The adjusted acceleration signal is used to determine whether a deployment crash event is occurring.

In response to the crash algorithm, the controller 24 outputs a control signal to an actuator 26, such as a squib of the type well known in the art. The squib or actuator 26 is operatively coupled to an actuatable occupant restraint 28 such as an air bag. Specifically, the squib is operatively connected to a source of gas generating material and/or bottle of pressurized gas. The squib is ignited by passing a predetermined electrical current through the squib for a predetermined time period. The squib ignites the gas generating material and/or pierces the pressurized gas bottle, thereby, actuating the restraint 28, e.g., inflating the air bag. In accordance with the present invention, the control algorithm monitors the crash acceleration, adjusts the value of the crash acceleration using a spring-mass model of an occupant, determines a crash velocity value and crash displacement value from the adjusted crash acceleration value, and determines if a deployment crash condition is occurring in response to the determined crash velocity and crash displacement value.

Figure 2:
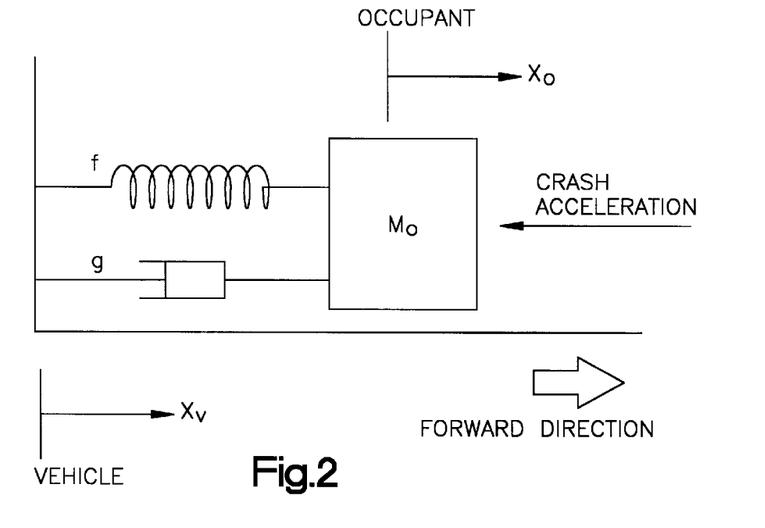
FIG. 2 is a schematic representation of an occupant spring-mass model used in the control process of the present invention.

Referring to FIG. 2, the occupant spring-mass model includes an occupant represented by a mass $M_o$. When the vehicle is subjected to a crash condition, the resulting crash acceleration $a(t)$ experienced by the vehicle is considered to be the driving function which gives an initial pulse to the occupant spring-mass model. A spring force $f(X)$, in the model, is a force on the occupant which results from the seat belt system. A damping force $g(V)$ in the occupant spring-mass model is the frictional effect on the occupant which results from the seat belt system, e.g., friction resulting from seat belt stretching due to occupant loading during a vehicle crash condition. The term $X_o$ (subscript "o" for "occupant") is used to represent the position of the occupant relative to an initial location (referred to herein as "ground") at the on-set of the vehicle crash condition. The term $X_v$ (subscript "v" for "vehicle") is used to represent the position of the vehicle relative to the ground location from the on-set of the vehicle crash condition. The equation of motion of the vehicle occupant can be expressed as:

$$M_o \ddot{X}_o + f(X_o - X_v) + g(\dot{X}_o - \dot{X}_v) = 0$$

since the sum of the forces must equal 0. By defining X to be:

$$X = X_o - X_v$$

and noting that:

$$-\ddot{X}_v = a(t)$$

one gets:

$$\ddot{X} = \frac{-f(X)}{M_o} + \frac{-g(\dot{X})}{M_o} + a(t)$$

where $$X(0) = \dot{X}(0) = 0.$$

Since the "occupant" for the spring-mass model is an "ideal" occupant, such occupant is represented by a crash dummy, referred to herein in equations as "dummy." The relative velocity of the occupant is designated "vel_dummy_rel" and the relative displacement of the occupant is designated "displ_dummy_rel" so that:

$$\dot{X}(t) = vel\_dummy\_rel$$

and $$X(t) = displ\_dummy\_rel$$

The normalized spring force "$f/M_o$" can be represented by:

$$\frac{f}{M_o} = \frac{K}{M_o} X$$

The normalized damping force "$g/M_o$" can be represented by:

$$\frac{g}{M_o} = B \cdot \frac{\dot{X}}{M_o}$$

Figure 3:
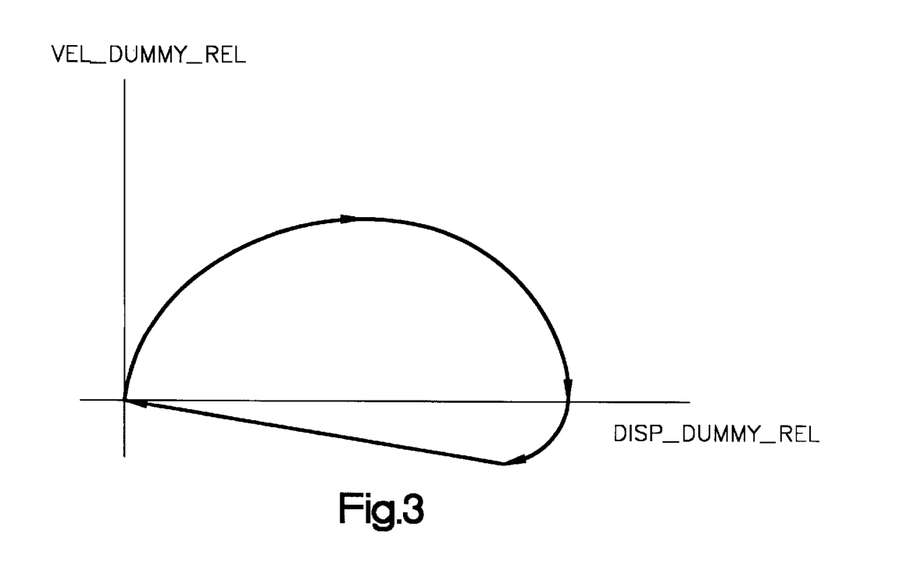
FIG. 3 is a graphical representation of the velocity of a crash dummy verses displacement of the crash dummy during a typical crash event.

Referring to FIG. 3, a plot of the vel_dummy_rel as a function of displ_dummy_rel (i.e., occupant relative velocity as a function of occupant relative displacement) is shown which would occur during a vehicle crash condition assuming the occupant spring-mass model.

Figure 4:
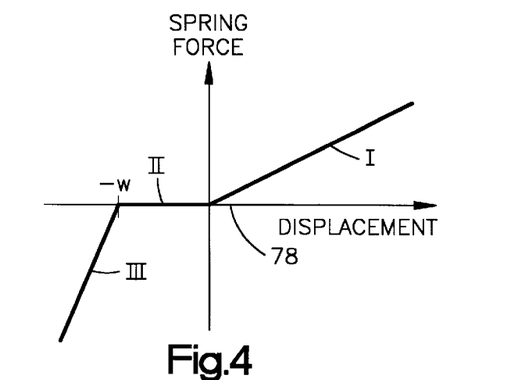
FIG. 4 is a graphical representation of spring force of a belted occupant as a function of occupant displacement for use with the spring-mass model of the present invention.

Referring to FIG. 4, a force value as a function of displacement relationship is shown for the spring portion of the spring-mass model of the present invention. The spring force f as a function of displacement d can be expressed as:

$$f(d) = K \cdot d$$

Three different values of K are used by the spring-mass model, in accordance with one embodiment of the present invention, with the value of K being dependant upon a determined displacement value. When the occupant is in zone I (i.e., displacement X>0), $K=K_x$. When the occupant is in zone II (i.e., $-w \leq X \leq 0$), K=0. When the occupant is in zone III (i.e., X<-w), $K=3K_x$.

Figure 5:
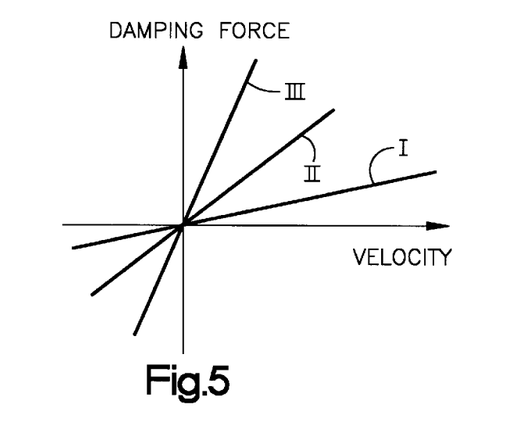
FIG. 5 is a graphical representation of damping force of a belted occupant as a function of occupant velocity for use with the spring-mass model of the present invention.

Referring to FIG. 5, the relationship of damping force as a function of both the velocity and displacement are depicted in accordance with the present invention. Three different values of B are shown dependent upon the determined displacement value. When the occupant is in zone I (i.e., X>0), $B=B_x$. When the Occupant is in zone II (i.e., $-w \leq X \leq 0$), $B=2B_x$. When the occupant is in zone III (i.e., X<-w), $B=3B_x$.

The mass-spring model of the present invention assumes a natural frequency of the occupant between 3–10 Hz. The values shown in FIGS. 4 and 5 are empirically determined to provide the desired discriminations for a particular vehicle platform. Other values may be empirically determined for a particular vehicle platform of interest.

Figure 6:
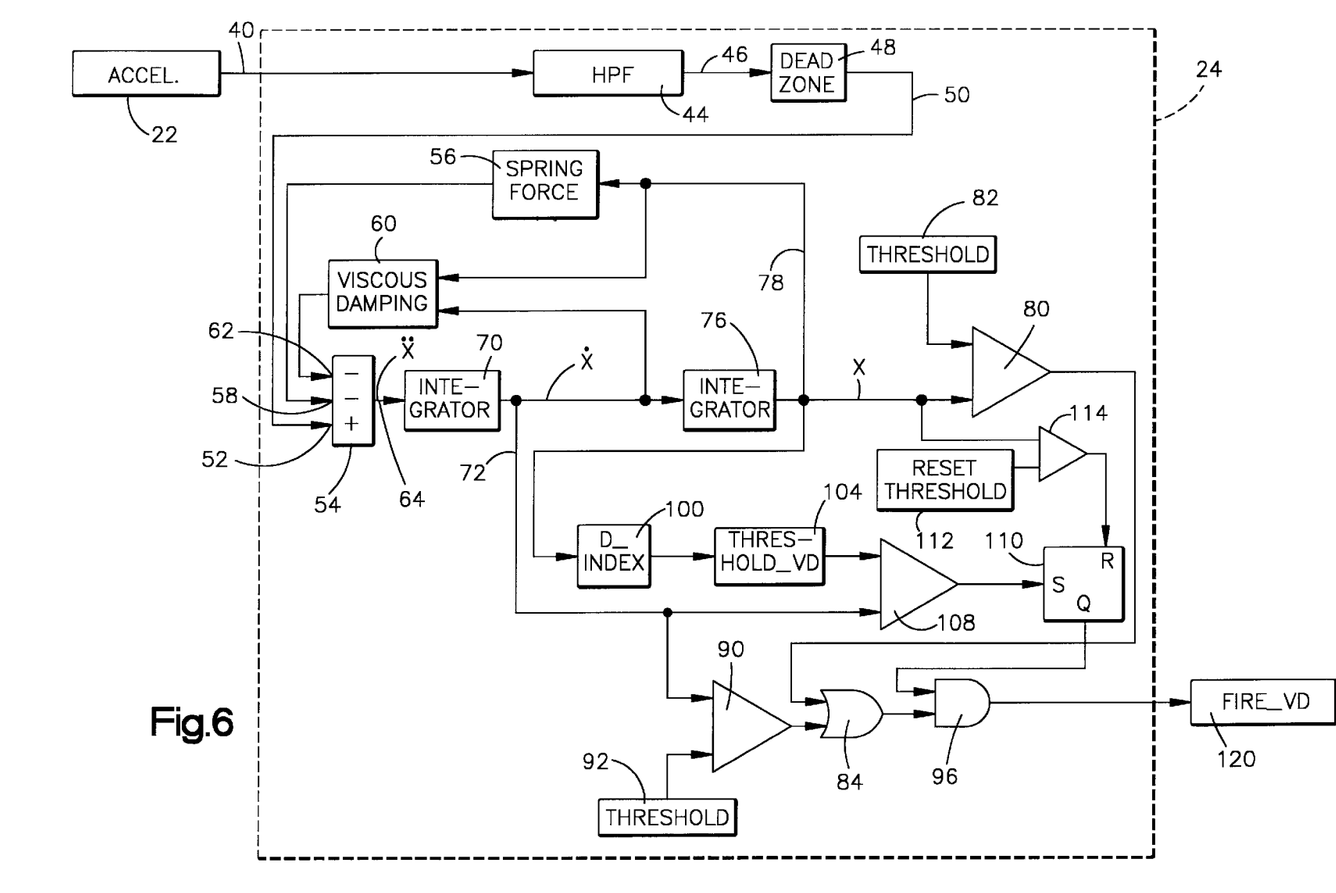
FIG. 6 is a schematic representation of the functions performed by the controller shown in FIG. 1.

FIG. 6 is a functional block diagram schematically representing the control processes performed by the controller 24 of FIG. 1. The elements shown in the controller block 24 correspond with operations performed internally by the controller 24. The controller 24 will usually be a microcomputer programmed to perform these functions in a methodical, sequential manner. Those skilled in the art will appreciate that the functions could be performed with discrete circuitry and that the combination of such discrete circuitry would then form the controller 24.

The accelerometer 22 outputs an acceleration signal 40 having a characteristic indicative of the vehicle's deceleration due to a crash event, also referred to in the art as "crash acceleration." The acceleration signal 40 is preferably pre-filtered by on-board filters physically mounted to an assembly carrying the accelerometer 22. These pre-filters eliminate "road noise" and other extraneous frequency components that are not indicative of a vehicle crash event. Additionally, the acceleration signal is digitally high-passed-filtered by the controller 24 using a high-pass-filter ("HPF") function 44. The filtered acceleration signal 46 is provided to a dead zone function 48.

The dead zone function 48 subtracts a value of ±1 g (g being the value of acceleration due to the earths gravity, i.e., 32 ft/sec$^2$) from the value of the acceleration signal. This dead zone functions as a calibration parameter. One function of the dead zone is to remove the effect of vehicle braking from the acceleration signal that is to be further processed for crash discrimination. Another function of the dead zone 48 is to re-align certain crash events such as pole crashes. During a pole crash, it is desirable to have the "beginning" of the crash event occur (for discrimination purposes) when the pole "hits" the engine block. Depending on the particular vehicle platform of concern and the desires of the vehicle manufacture, the calibration parameter of the dead zone function 48 could be zero or a value greater than 1.

The dead zone function 48 outputs a modified acceleration signal 50 to a positive input 52 of a summing circuit 54. A spring force function 56 outputs a spring force value to a negative input 58 of the summing circuit 54. A viscous damping function 60 outputs a viscous damping value to a negative input 62 of the summing circuit 54. The output 64 of the summing circuit 54 is an adjusted acceleration signal that has been adjusted in response to the occupant spring-mass model and thus more nearly represents true acceleration of the vehicle occupant. Initially, the values of the spring force 56 and the viscous damping 60 are set to zero. Their values are changed upon determination of crash velocity and crash displacement in a manner described below. Since further discrimination is performed on an adjusted acceleration signal that represents the "actual" or "virtual" acceleration of the occupant, the adjusted signal is referred to as a virtual sensor signal.

The adjusted acceleration signal (output 64) is applied to the input of an integrator function 70. The output 72 of the integrator function 70 is the crash velocity value of the adjusted crash acceleration value (i.e., it is the virtual occupant velocity arising from the crash acceleration). The output 72 is applied to the input of the viscous damping function 60 and to a second integrator function 76. The output 78 of the integrator function 76 is the crash displacement based on the adjusted crash acceleration value 64 (i.e., it is the virtual occupant displacement arising from the crash acceleration). The output 78 of the integrator function 78 is applied to the spring force function 56 and to the viscous damping function 60.

The spring force function 56 determines a spring force value to be input to the summing circuit 54 by using the values graphically depicted in FIG. 4. In a microcomputer embodiment of the invention, these values will be stored in a look-up table or will be calculated. In response to the determined displacement value 78, the spring force value is output. In an analog embodiment of the invention, conventional circuit network techniques may be readily used to fabricate a functional block having the transfer characteristics illustrated in FIG. 4.

The viscous damping function 60 determines a viscous damping value to be input to the summing circuit 54 by using the values graphically depicted in FIG. 5. In a microcomputer embodiment of the invention, these values will be stored in a look-up table or will be calculated. In response to both the determined virtual displacement value 78 and the determined virtual velocity value 72, the viscous damping value is output. In an analog embodiment of the invention, the viscous damping function can be conveniently implemented as a variable gain amplifier having the input taken from the output of integrator 70. The gain of the amplifier preferably will be one of several values, with the particular value in effect at a given time being selected as a function of the virtual displacement signal appearing at the output of the integrator 76. In a simplified embodiment, however, the gain of the viscous damping function may have a single, fixed value corresponding to the value used in zone I.

The value of the virtual displacement 78 is input to one input of a comparator function 80. The other input of the comparator function 80 is connected to a predetermined fixed threshold value 82. If the virtual displacement value 78 is greater than the threshold value 82, the comparator function 80 outputs a digital HIGH. Otherwise, the output of the comparator function 80 is a digital LOW. The output of the comparator function 80 is applied to one input of an OR function 84.

The value of the virtual velocity 72 is applied to one input of a comparator function 90. The other input of the comparator function 90 is connected to a predetermined fixed threshold value 92. If the virtual crash velocity value 72 is greater than the threshold value 92, the comparator function 90 outputs a digital HIGH. Otherwise, the output of the comparator function 90 is a digital LOW. The output of the comparator function 90 is applied to the other input of an OR function 84. The output of the OR function 84 is applied to one input of an AND function 96.

Figure 7:
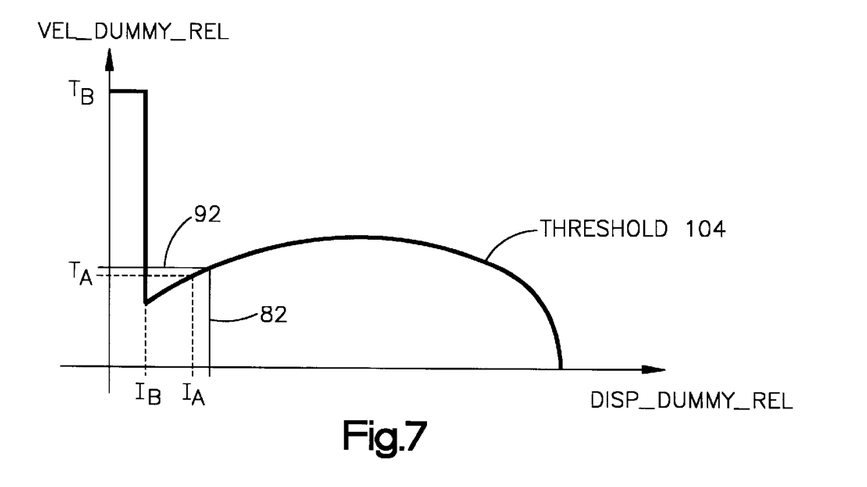
FIG. 7 is a graphical representation of a variable threshold value used by the present invention with the value of the occupant velocity (relative to vehicle coordinates) being on the Y-axis and occupant displacement (relative to vehicle coordinates) being on the X-axis.

The virtual crash displacement value 78 is also output to a displacement indexing function 100 ("D_INDEX"). The indexing function 100 divides the determined virtual displacement value 78 into discrete values which are used to index a look-up table 104. One of the discrete displacement values is supplied to the displacement threshold determining function 104 ("THRESHOLD_VD"). The output of the threshold determining function 104 is applied to one input of a comparator function 108. The threshold value output from the function 104 is graphically depicted in the graph of FIG. 7. For example, an index value of $I_A$ will select a threshold value of $T_A$. The values depicted in the graph are empirically determined to achieve desired restraint actuation when combined with other deployment requirements. Initially (index less than $I_B$), the value of the threshold value is set to a predetermined, high value ($T_B$). This ensures that an initial high value of the acceleration (e.g., an initial acceleration spike) will not result in premature actuation of the restraint.

The velocity value 72 is supplied to the other input of the comparator function 108. The comparator function 108 determines if the virtual crash velocity value 72 is greater than the displacement-dependent variable threshold value 104. If the determination is affirmative, a digital HIGH is output from the comparator function 108. Otherwise, a digital LOW is output from the comparator function 108.

The output of the comparator function 108 is connected to a latch function 110. When a HIGH is output by comparator function 108, the HIGH at the "set" input of latch 110 causes the Q output of latch function 110 to be set HIGH. Latch function 110 continues to output a HIGH until reset. Reset of latch 110 occurs when the virtual displacement value 78 decreases below a reset threshold value 112. To accomplish the reset, the virtual displacement value 78 is connected to one input of a comparator 114. A reset threshold value 112 is provided to the other input of comparator 114. The output of the comparator 114 is connected to a reset input of latch 110. The Q output of latch 110 is connected to the other input of the AND function 96.

The output of the AND function 96 is a FIRE signal 120 which is output to the actuator 26 (FIG. 1). Those skilled in the art will appreciate that the active restraint 28 is actuated, in accordance with the deployment control logic of the present invention, (i) when the determined velocity value 72 is greater than threshold 92 OR the determined displacement value 78 is greater than the threshold 82 AND (ii) when the determined velocity value 72 is greater than the displacement dependent threshold value 104. The purpose of the latch 110 is to ensure existence of an affirmative comparison from comparator 108 (i.e., a HIGH) for a time sufficient for the other needed logic determination.

Figure 8A:
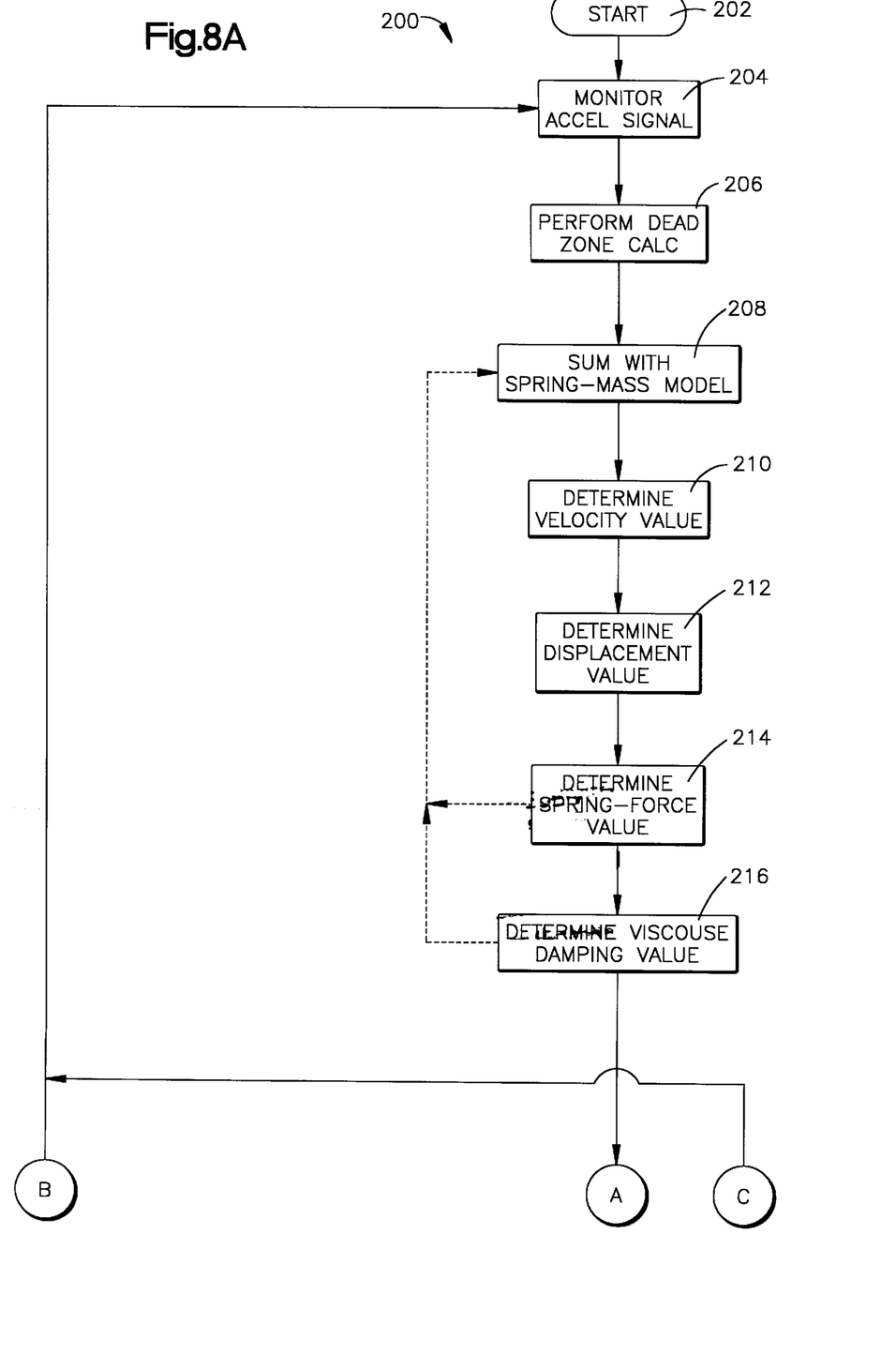
FIGS. 8A and 8B depict, in flow chart form, the control process in accordance with the present invention.
Figure 8B:
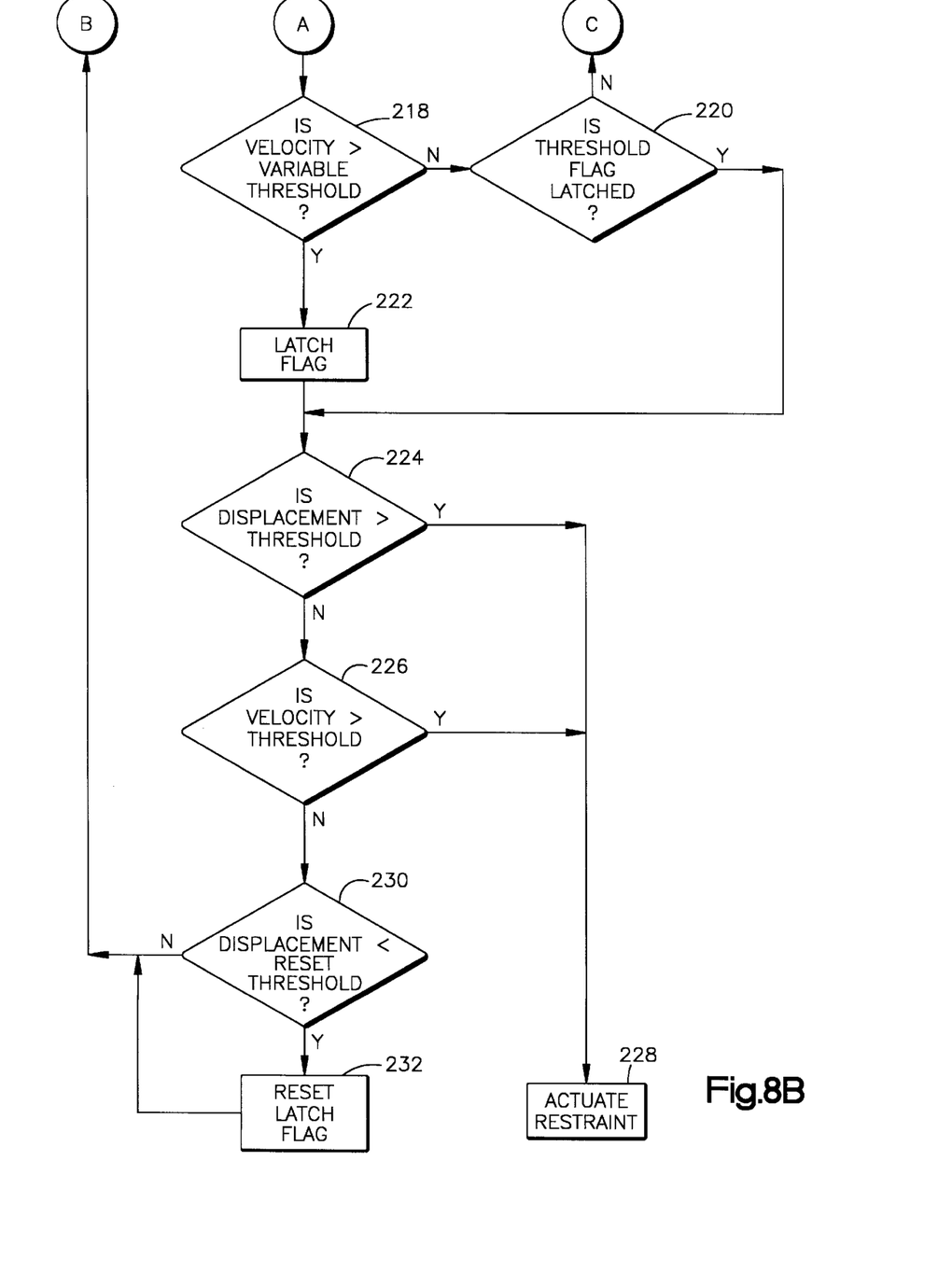

A control process 200, in accordance with one embodiment of the present invention, is represented in FIGS. 8A and 8B. It is assumed, for the purposes of description, that the controller 24 is a microcomputer and that the control process 200 is carried out via an internal program. The internal elements of the microcomputer are conventional and will not be described. The process starts with step 202 in which memories are cleared, flags are set to initial conditions, etc. In step 204, the present value of the acceleration signal is retrieved from an internal A/D converter. The A/D converter converts the value of the acceleration signal 40 into a digital value. Also, in step 204, the acceleration signal is digitally filtered.

The process then proceeds to step 206 where the dead zone realignment function is performed as described above. In step 208, the realigned and filtered acceleration value is summed with spring force and viscous damping values stored in memory. As stated previously, the initial spring force and viscous damping values will be zero. This yields an adjusted or "virtual" acceleration value. In step 210, the virtual velocity value is determined by software integration of the virtual acceleration value. In step 212, the virtual crash displacement value is determined by software integrations of the virtual velocity.

The process then proceeds to step 214 in which the spring-force value is calculated in accordance with the FIG. 4 transfer function. In step 216, the viscous damping value is calculated in accordance with the FIG. 5 transfer function. These values calculated in steps 214 and 216 are then stored in memory for later use in the next pass through step 208. The initial pass through step 208 uses zero for these two values. All subsequent passes through step 208 uses the calculated values. This "feedback" process is represented by the dotted line running from steps 214 and 216 back to step 208.

The process proceeds to step 218, In step 218, the variable threshold value 104 is determined. As part of this step, the value of the displacement determined in step 212 is used to index (address) a look-up table in which the FIG. 7 pattern of threshold values is stored. Further in step 218, a determination is made as to whether the virtual crash velocity value determined in step 210 is greater than the variable threshold value 104.

If the determination in step 218 is negative, the process proceeds to step 220. In step 220, a determination is made as to whether the velocity threshold flag has been latched. The velocity threshold flag is originally set to a FALSE latched condition or logic "0" state. If the determination in step 220 is negative, the process returns to step 204. Otherwise, process flow proceeds to step 224. Thus, steps 224 through 232 may only be performed if the virtual velocity is above the threshold value 104 or has been above the threshold previously during this crash event.

When the determination in step 218 is affirmative, the latch 110 is set in step 222, i.e., the latch state is set to a TRUE logic or logic "1". From step 222 or from an affirmative determination in step 220, the process proceeds to step 224. In step 224, a determination is made as to whether the virtual crash displacement value determined in step 212 is greater than the threshold value 82. If the determination in step 224 is negative, the process proceeds to step 226.

In step 226, a determination is made as to whether the virtual crash velocity value determined in step 210 is greater than the threshold value 92. If the determination in step 224 or step 226 is affirmative, the process actuates the restraint in step 228. If the determination in step 226 is negative, the process proceeds to step 230 where it is determined if the displacement value determined in step 212 is now less than the reset threshold value 112. The reset threshold value 112 is less than threshold value 82. If the determination in step 230 is affirmative, the process proceeds to step 232 where the flag of latch 110 is reset. From either a negative determination in step 230 or from step 232, the process returns to step 204.

Figure 9:
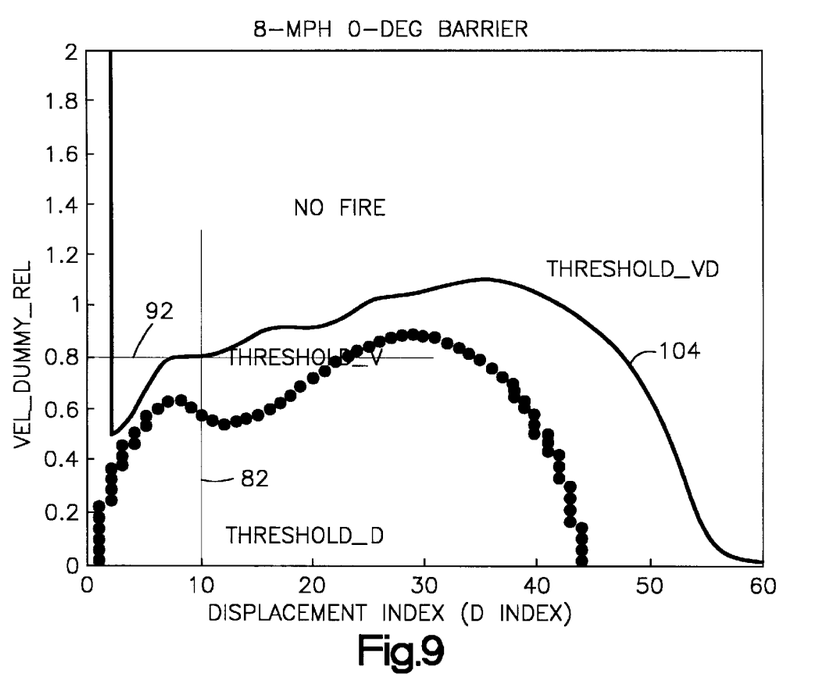
FIGS. 9–11 are graphical representations of determined occupant velocity versus occupant displacement during various types of non-deployment events.

FIG. 9 shows an 8 MPH 0° barrier crash event which is a NO FIRE crash event, i.e., one in which the air bag is not to be deployed. The velocity values 72 versus indexed displacement values 100 for the crash event determined by the controller 24 are shown by dots in the graph for a particular vehicle platform. The three threshold values 82, 92, 104 are shown. Although both the fixed threshold values 82 and 92 are exceeded during the crash event, the variable threshold value 104 is never exceeded. Since the ANDing function 96 can not be satisfied, no deployment of the air bag occurs.

Figure 10:
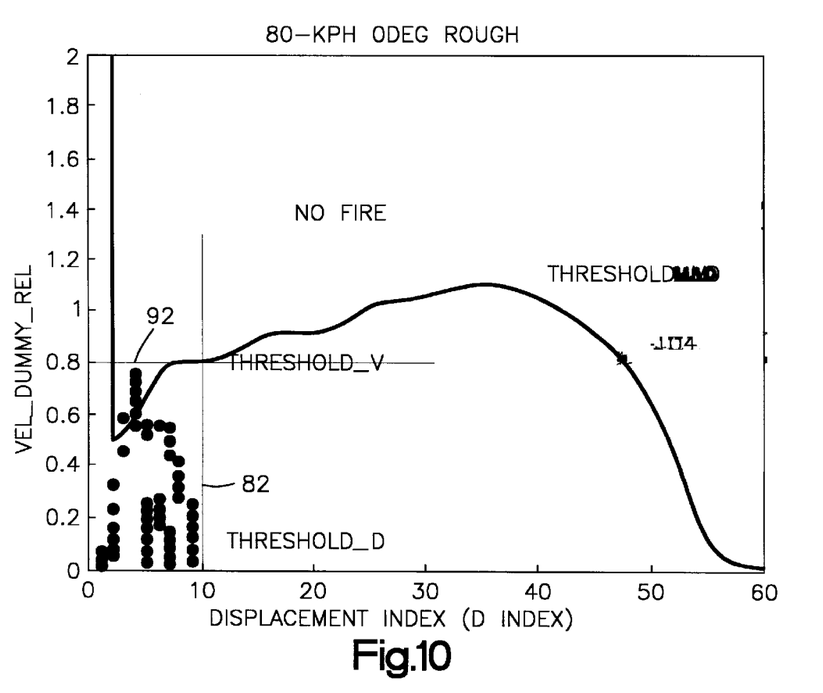

FIG. 10 shows an 80 MPH rough road travel condition of the vehicle. Such a travel condition will produce outputs from the accelerometer which, in fact "sees" a plurality of acceleration events. This travel condition is, of course, a NO FIRE event, i.e., one in which the air bag is not to be deployed. The velocity values 72 versus indexed displacement values 100 for the event determined by the controller 24 are shown by dots in the graph for a particular vehicle platform. The three threshold values 82, 92, 104 are also shown. Although the variable threshold value 104 is exceeded during the travel event, neither of the fixed threshold values 82 and 92 are ever exceeded. Since the ANDing function 96 can not be satisfied, no deployment of the air bag occurs.

Figure 11:
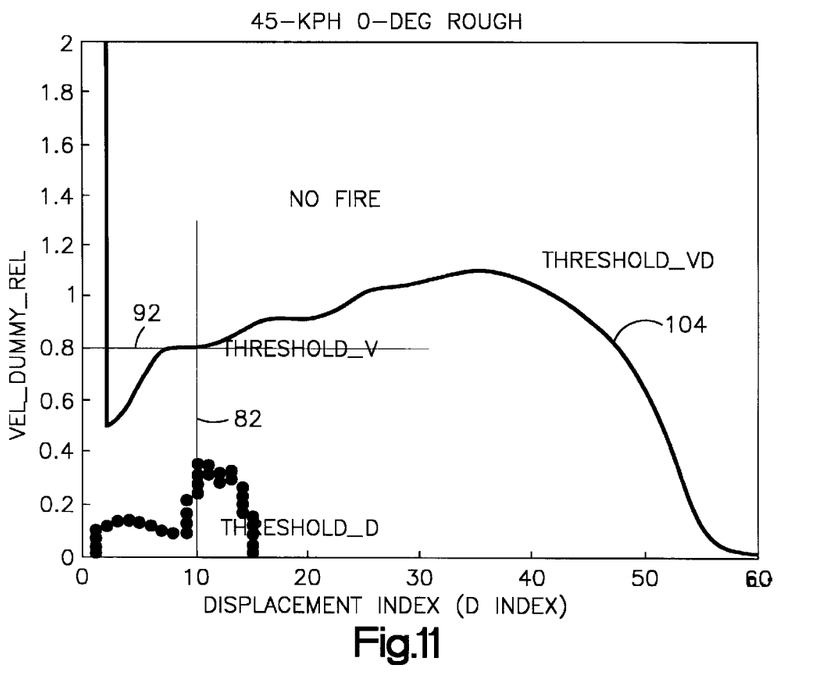

FIG. 11 shows a 40 MPH rough road travel condition of the vehicle. Such a travel condition will produce outputs from the accelerometer which, in fact "sees" a plurality of acceleration events. This travel condition is, of course, a NO FIRE event, i.e., one in which the air bag is not to be deployed. The velocity values 72 versus indexed displacement values 100 for the event determined by the controller 24 are shown by dots in the graph for a particular vehicle platform. The three threshold values 82, 92, 104 are also shown. Although the fixed threshold value 82 is exceeded during the travel event, the threshold value 104 is never exceeded. Since the ANDing function 96 can not be satisfied, no deployment of the air bag occurs.

Figure 12:
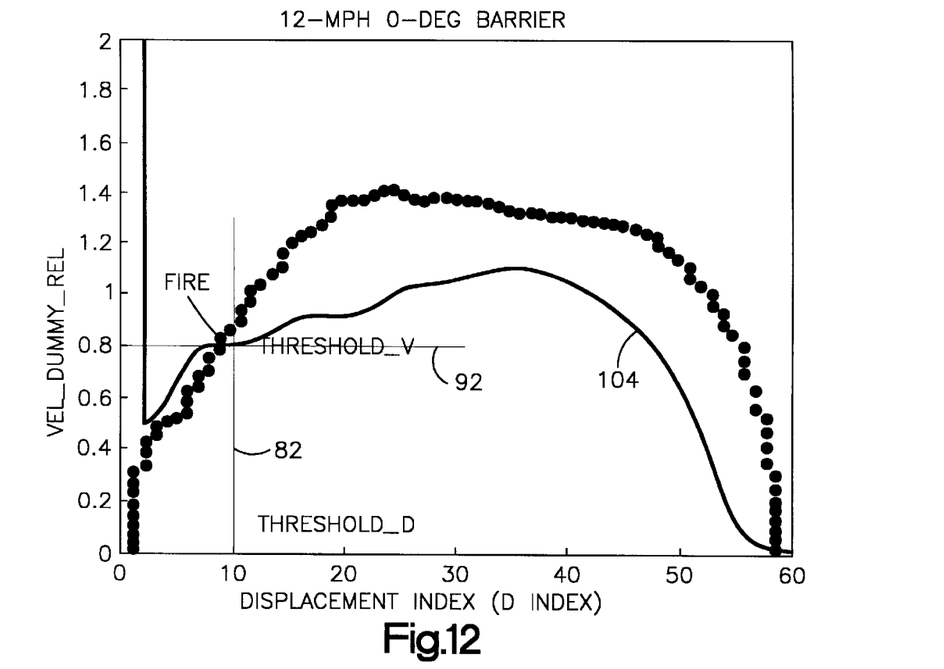
FIGS. 12–16 are graphical representations of determined occupant velocity versus occupant displacement during various types of deployment events.

FIG. 12 shows a 12 MPH 0° barrier crash event of the vehicle. This crash event is a FIRE crash event, i.e., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed (fired) when the threshold values 92 AND 104 are exceeded.

Figure 13:
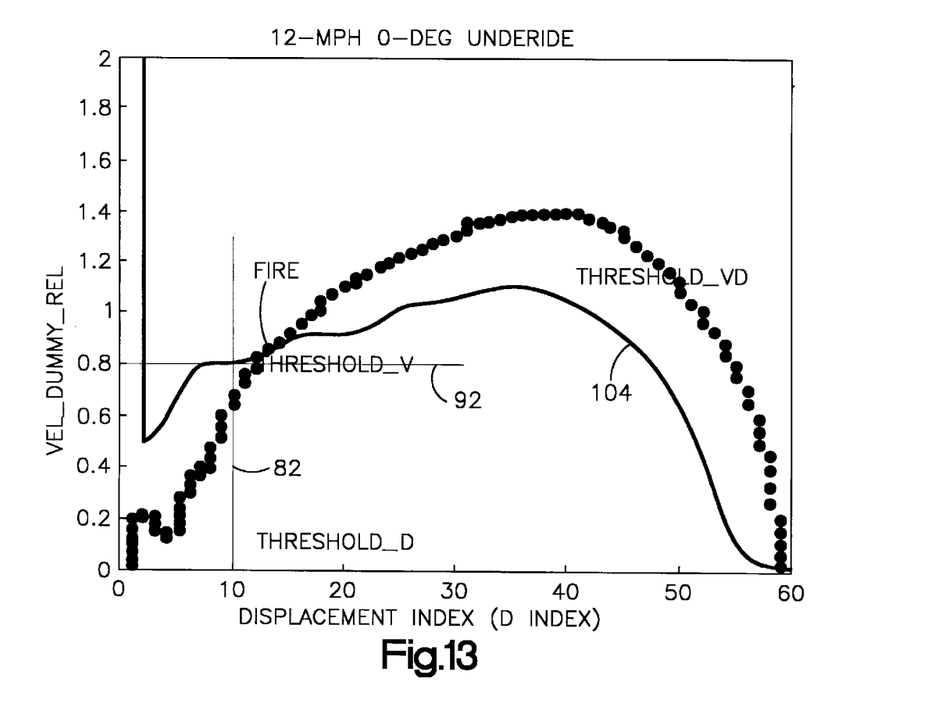

FIG. 13 shows a 12 MPH 0° underride crash event of the vehicle. This crash event is a FIRE crash event, i.e., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed (fired) when the threshold values (82 OR 92) AND 104 are exceeded.

Figure 14:
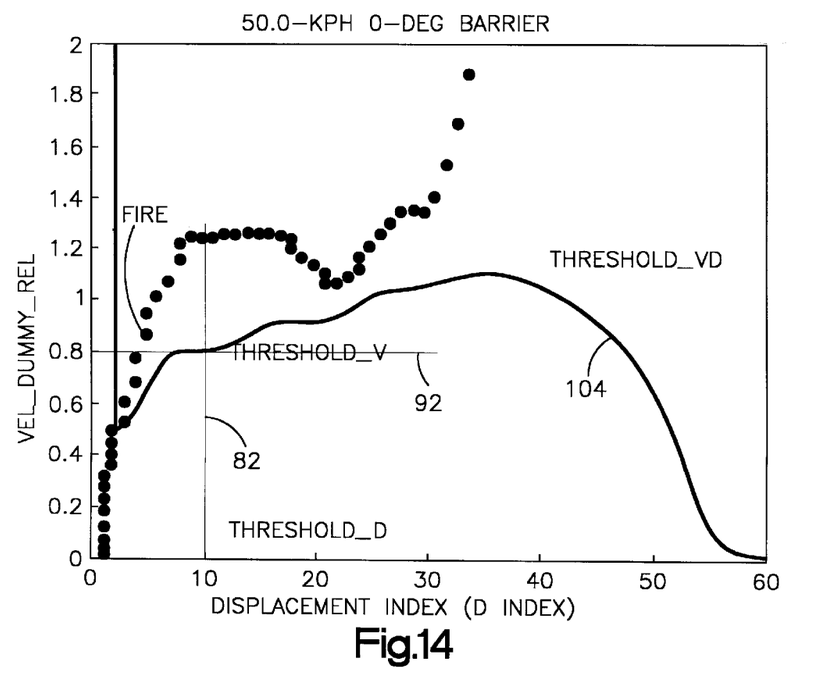

FIG. 14 shows a 50 KPH 0° barrier crash event of the vehicle. This crash event is a FIRE crash event, i.e., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed (fired) when the threshold values 92 AND 104 are exceeded.

Figure 15:
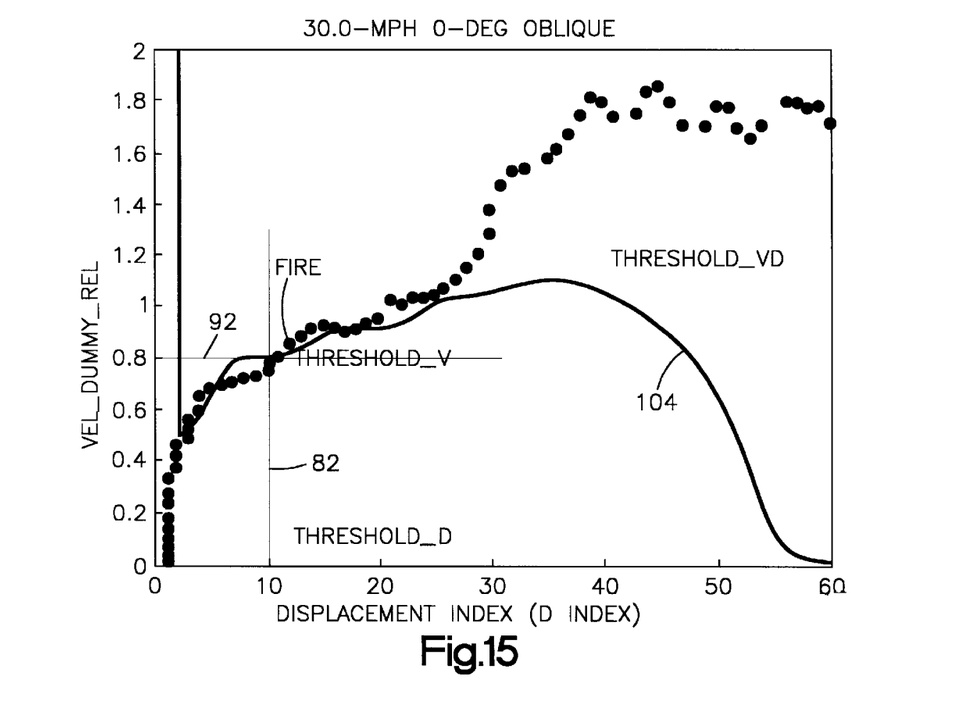

FIG. 15 shows a 12 MPH 0° oblique crash event of the vehicle. This crash event is a FIRE crash event, i.e., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed (fired) when the threshold values (82 OR 92) AND 104 are exceeded.

Figure 16:
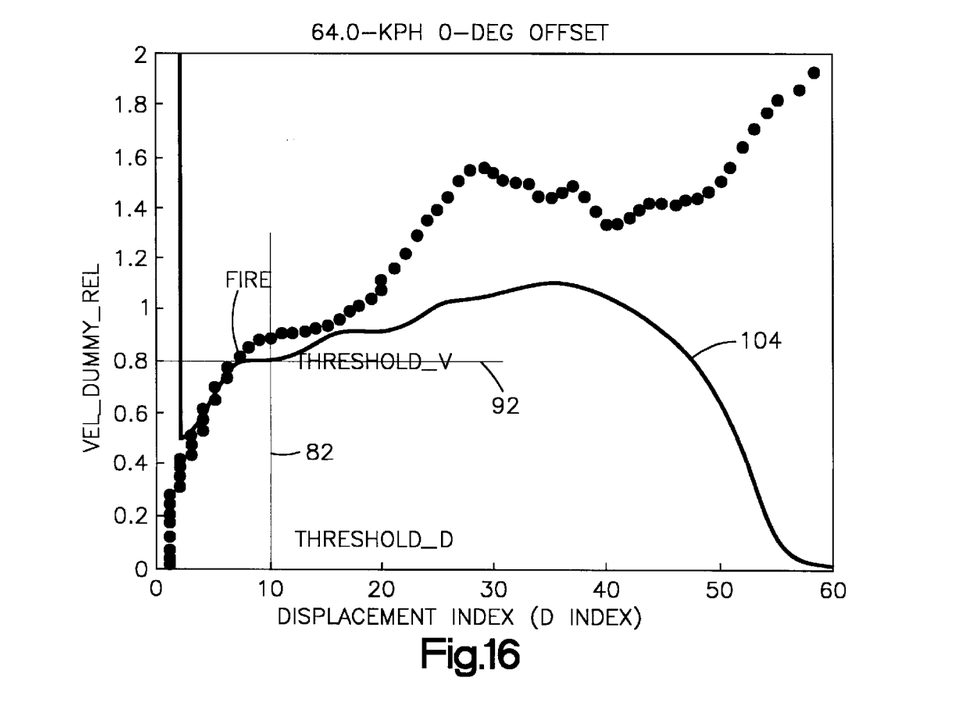

FIG. 16 shows a 64 KPH 0° offset crash event of the vehicle. This crash event is a FIRE crash event, i.e., one in which the air bag is to be deployed. The velocity values 72 versus indexed displacement values 100 for the crash event determined by the controller 24 are shown by dots in the graph for a particular vehicle platform. The three threshold values 82, 92, 104 are also shown. The air bag is deployed (fired) when the threshold values 92 AND 104 are exceeded.

From the above description of the invention, those skilled in the art will perceive improvements, changes, and modifications. For example, the spring-mass model used in the present invention has assumed a belted occupant in the selection of force and damping values. The present invention using virtual sensing is also applicable to an unbelted occupant. The force and damping values used in a spring-mass model for an unbelted occupant would be non-zero and values that are less than those that would be used for the belted occupant for a vehicle platform of interest. In some systems, it may be desirable to switch between different spring force and damping values based upon the state of the seat belt (buckled/unbuckled) and/or upon such occupant characteristics as weight (as measured by a seat pad, for example) or size. The force and damping values may also be based upon the occupant's pre-crash position. Improvements, changes, and modifications within the skill of the art are intended to be covered by the appended claims.

Having described the invention, the following is claimed:

1. An apparatus for controlling an actuatable restraining device, said apparatus comprising:

sensing means securable to a vehicle for sensing crash acceleration and for providing a crash acceleration signal indicative thereof;

processing means for processing said crash acceleration signal with an occupant spring-mass model so as to provide an adjusted crash acceleration signal; and discriminating means for controlling said actuatable restraining device in response to said adjusted crash acceleration signal.

2. The apparatus of claim 1 wherein said processing means further includes means for decreasing the value of said crash acceleration signal by a spring force term and a viscous damping term of said spring-mass model.

3. The apparatus of claim 1 wherein the spring-mass model is based on a belted occupant.

4. The apparatus of claim 1 wherein the spring-mass model is based on an unbelted occupant.

5. The apparatus of claim 1 wherein said discriminating means further includes means for determining a crash velocity value and a crash displacement value in response to said adjusted crash acceleration signal.

6. The apparatus of claim 5 wherein said discriminating means further includes means for comparing said determined crash velocity value and said crash displacement value against associated threshold values.

7. The apparatus of claim 6 wherein said discriminating means further includes means for determining a variable threshold value functionally related to the determined crash displacement value and means for comparing said crash velocity value against said variable threshold value.

8. The apparatus of claim 7 wherein said discriminating means further includes means for actuating said actuatable restraining means (i) when said determined crash velocity value or said determined crash displacement value are greater than said associated threshold values and (ii) when said determined crash velocity value is greater than said variable threshold value.

9. A method for controlling an actuatable restraining device, said method comprising the steps of:

sensing crash acceleration and providing a crash acceleration signal indicative thereof;

processing said crash acceleration signal with an occupant spring-mass model so as to provide an adjusted crash acceleration signal; and controlling said actuatable restraining device in response to said adjusted crash acceleration signal.

10. The method of claim 9 wherein said step of processing includes decreasing the value of said crash acceleration signal by a spring force term and a viscous damping term of said spring-mass model.

11. The method of claim 9 further including the step of determining said spring-mass model based on a belted occupant.

12. The method of claim 9 further including the step of determining said spring-mass model based on an unbelted occupant.

13. The method of claim 9 wherein said step of controlling includes the step of determining a crash velocity value and a crash displacement value in response to said adjusted crash acceleration signal.

14. The method of claim 13 wherein said step of controlling includes the step of comparing said determined crash velocity value and said crash displacement value against associated threshold values.

15. The method of claim 14 wherein said step of controlling further includes the steps of determining a variable threshold value functionally related to the determined crash displacement value and comparing said determined crash velocity value against said determined variable threshold value.

16. The method of claim 15 wherein said step of controlling further includes the step of actuating said actuatable restraining means (i) when said determined crash velocity value or said determined crash displacement value are greater than said associated threshold values and (ii) when said determined crash velocity value is greater than said variable threshold value.

* * * * *